(12) United States Patent
Tsai

(10) Patent No.: US 8,087,558 B2
(45) Date of Patent: Jan. 3, 2012

(54) BICYCLE ACCESSORY HOLDING DOCK

(75) Inventor: Chin Hui Tsai, Chang Hua (TW)

(73) Assignee: Handyway Co., Ltd., Chang Hua (TW)

( * ) Notice: Subject to any disclaimer, the term of this patent is extended or adjusted under 35 U.S.C. 154(b) by 399 days.

(21) Appl. No.: 12/458,304

(22) Filed: Jul. 8, 2009

(65) Prior Publication Data

US 2011/0006094 A1  Jan. 13, 2011

(51) Int. Cl.
  *B62J 11/00* (2006.01)
  *B60R 9/00* (2006.01)
(52) U.S. Cl. ......... 224/425; 224/431; 224/448; 224/935
(58) Field of Classification Search ................. 224/412, 224/431, 419, 441, 448, 425, 427, 935; 70/233; 403/321, 322.1, 322.2, 325
See application file for complete search history.

(56) References Cited

U.S. PATENT DOCUMENTS

| 5,718,134 | A | * | 2/1998 | Chang | 70/233 |
| 6,095,386 | A | * | 8/2000 | Kuo | 224/448 |
| 6,557,808 | B1 | * | 5/2003 | Ling | 248/229.1 |
| 7,311,233 | B2 | * | 12/2007 | Chen | 224/425 |
| 2008/0035690 | A1 | * | 2/2008 | Hsai | 224/425 |

* cited by examiner

*Primary Examiner* — Justin Larson
(74) *Attorney, Agent, or Firm* — Rosenberg, Klein & Lee

(57) ABSTRACT

A bicycle accessory holding dock to hang a bicycle accessory. The accessory holding dock includes an anchor seat with a coupling portion to couple with a retaining ring to allow an accessory coupling seat to be wedged and retained on the anchor seat. Thus the accessory can be hung in a direction as required according to varying wedged directions.

5 Claims, 5 Drawing Sheets

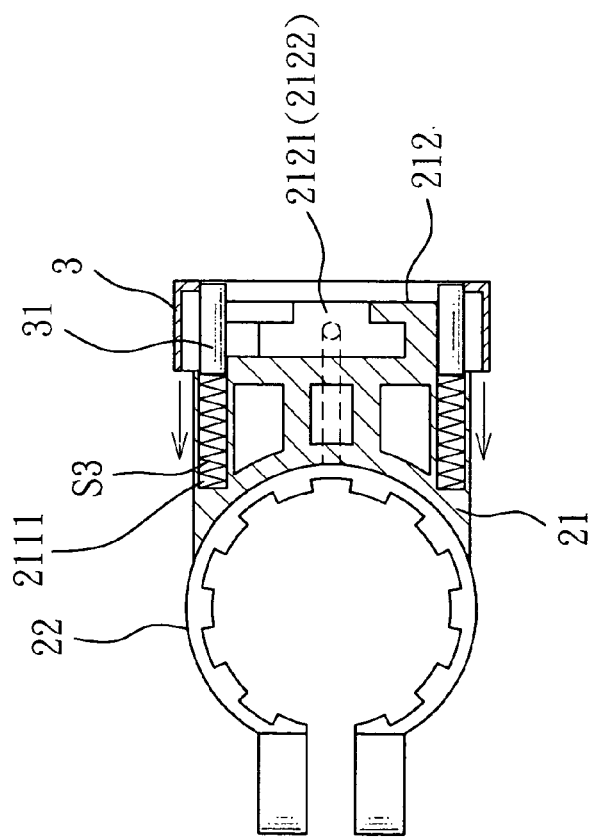
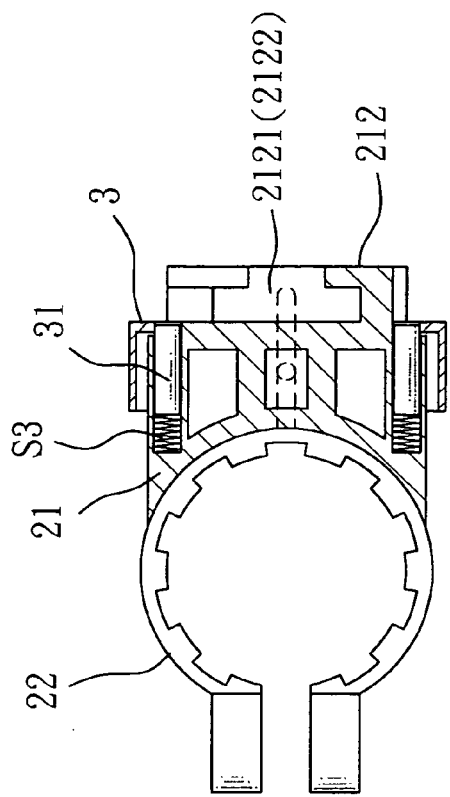
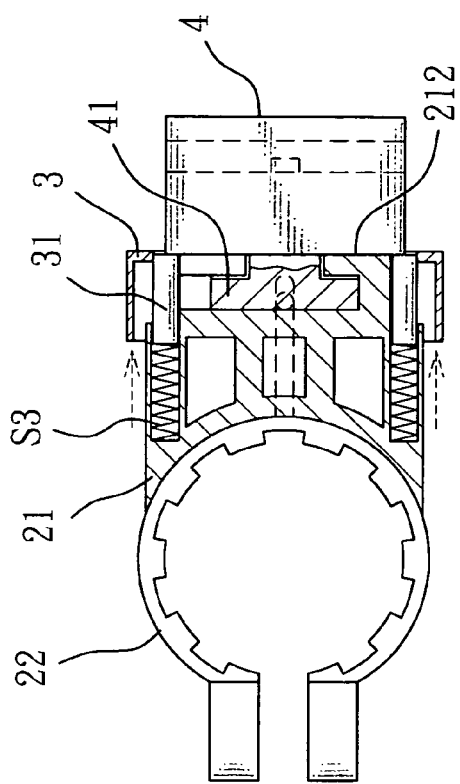

BICYCLE ACCESSORY HOLDING DOCK

BACKGROUND OF THE INVENTION

1. Field of the Invention

The present invention relates to a bicycle accessory holding dock and particularly to a holding dock that provides a wedge direction allowing an accessory to be quickly hung as required.

2. Description of the Prior Art

A conventional bicycle accessory holding dock 1, referring to FIG. 1, includes an anchor seat 11, a sleeve 12, a holding seat 13, a push element 14, a thrust element 15 and a spacer 16.

The anchor seat 11 is fastened to a bicycle frame, and has a fastening portion 111 at one side run through by a bolt for fastening and a coupling portion 112 at another side. The coupling portion 112 has a round hole 113 on each of two sides, and a first recess 114 at the front end.

The sleeve 12 is a hollow barrel, and has a pin hole 121 on each of two sides inserted by a pin 123 into the round hole 113 of the anchor seat 11 to form fastening therewith. The sleeve 12 has a plurality of latch notches 122 on an annular inner side of one edge.

The holding seat 13 is held in the sleeve 12, and has at least one wedge trough 131 at the front end to hold an accessory (not shown in the drawings). The holding seat 13 has a latch element 132 jutting from the perimeter of the rear end to wedge in the latch notch 122 of the sleeve 12. It also has a housing chamber 133 inside with an opening to hold, in this order, the push element 14, a thrust element 15, a first spring S1, the spacer 16 and a second spring S2. The housing chamber 133 has two guiding ribs 134 and at least on annular groove 135 inside, an opening 136 on one side, and a through hole 137 at the front side communicating with the wedge trough 131.

The push element 14 is located in the housing chamber 133 and has one end extended through the opening 136 at one side of the housing chamber 133 and another end with a slot 141 and a first sloped surface 142 formed thereon, and a jutting detent ledge 143 formed respectively on an upper side and a lower side thereof.

The thrust element 15 is held in the housing chamber 133 and has a second sloped surface 151 mating the first sloped surface 142 to butt each other, and one end with a strut 152 formed thereon to run through the through hole 137 of the holding seat 13, and another end with a cavity 153 formed thereon to hold the first spring S1. It also has a jutting guiding trench 154 formed respectively on an upper side and a lower side to be wedged by the guiding rib 134.

The spacer 16 is held in the housing chamber 133, and has a plurality of jutting lugs 161 on the perimeter to latch the annular groove 135, and has a second recess 162 at the front side to be pressed by the first spring S1 and another side pressed by the second spring S2. The second spring S2 has another end pressing the first recess 114 of the anchor seat 11.

Based on the structure set forth above, by pushing and turning the holding seat 13 the holding direction of the accessory can be adjusted without using tools. While it is easy to use, it still has drawbacks in practice, notably:

1. Its structure is complex. Moreover the accessory hung on the wedge trough 131 is prone to loosen off due to shaking of bicycle during riding.

2. Changing the hanging direction of the accessory is accomplished by pushing and turning the holding seat 13 with user's fingers. As the second spring S2 has a greater elastic force, users also have to render a greater effort to do operation. Moreover, when the thrust force is inadequate accurate positioning is difficult. This results in insecure holding of the accessory.

SUMMARY OF THE INVENTION

Therefore the primary object of the present invention is to provide a bicycle accessory holding dock that has an anchor seat with a coupling portion at one side coupled with a retaining ring to hold an accessory coupling seat to hang a bicycle accessory. Such a structure allows the accessory to be hung in a direction as desired in a mating wedge direction and hanging operation can be accomplished quickly.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 5 is a sectional view of operating condition-1 of the invention.

FIG. 6 is a sectional view of operating condition-2 of the invention.

FIG. 7 is a sectional view of operating condition-3 of the invention.

DESCRIPTION OF THE PREFERRED EMBODIMENTS

Figure 1:
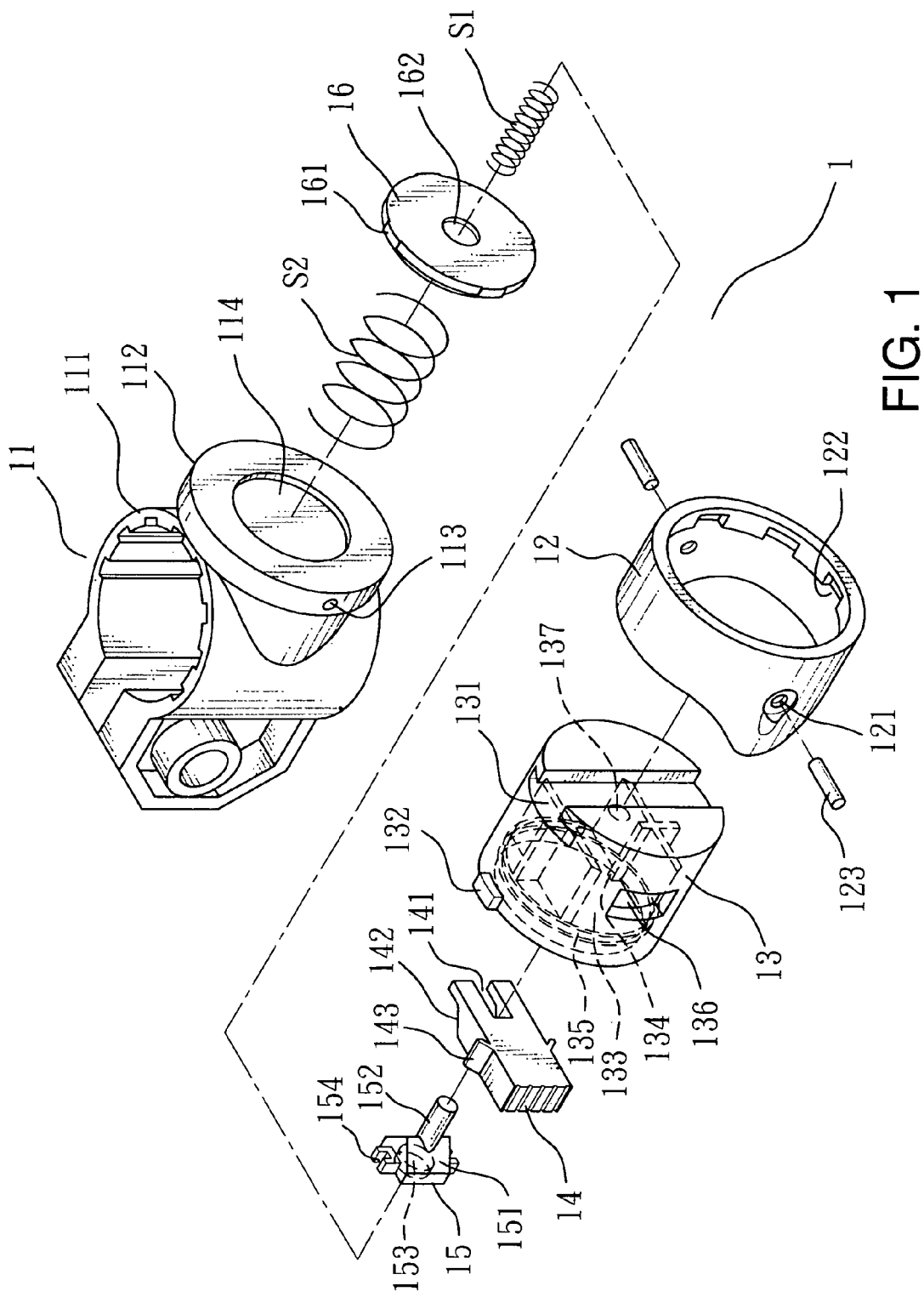
FIG. 1 is an exploded view of a conventional accessory holding dock.
Figure 3:
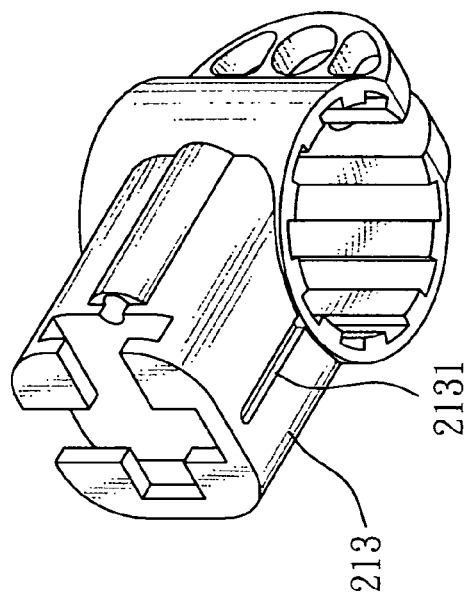
FIG. 3 is a perspective view of the anchor seat.
Figure 2:
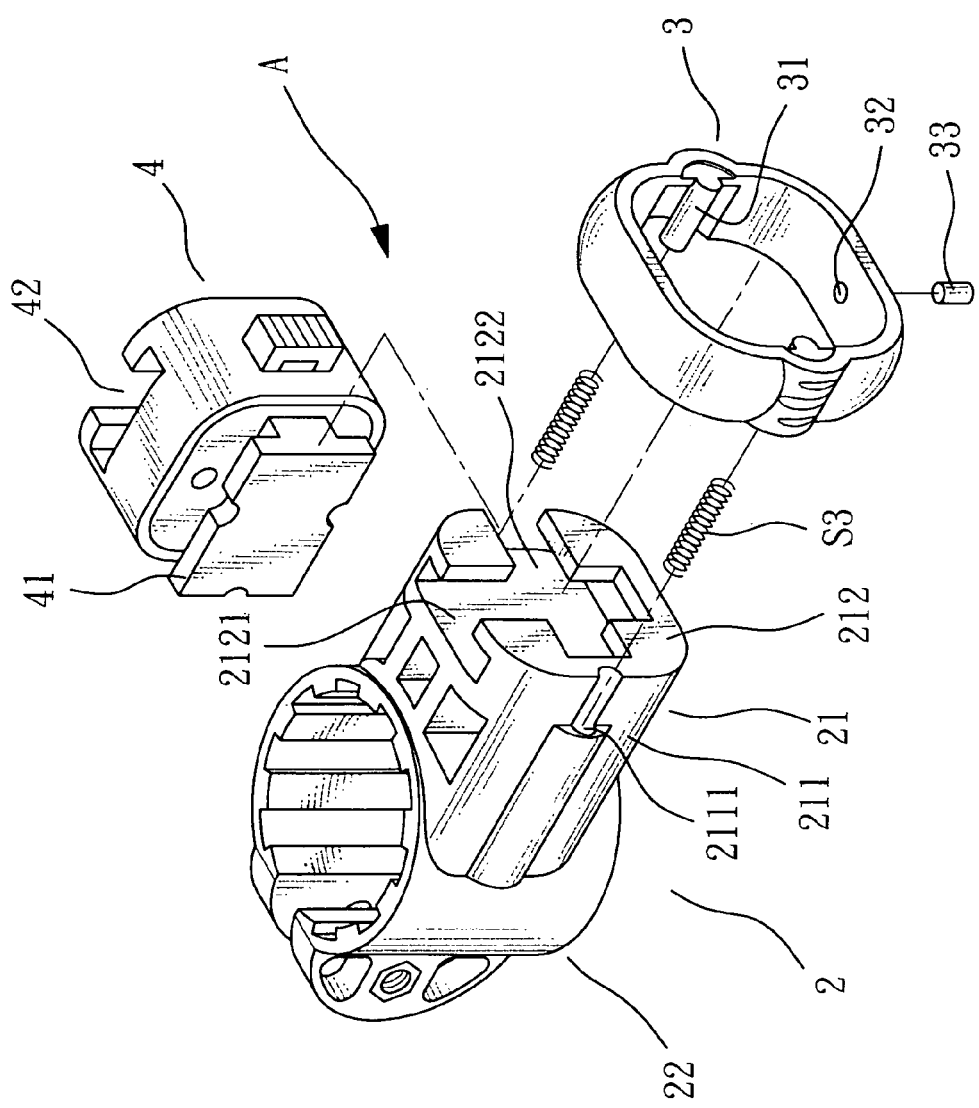
FIG. 2 is an exploded view of the invention.
Figure 4:
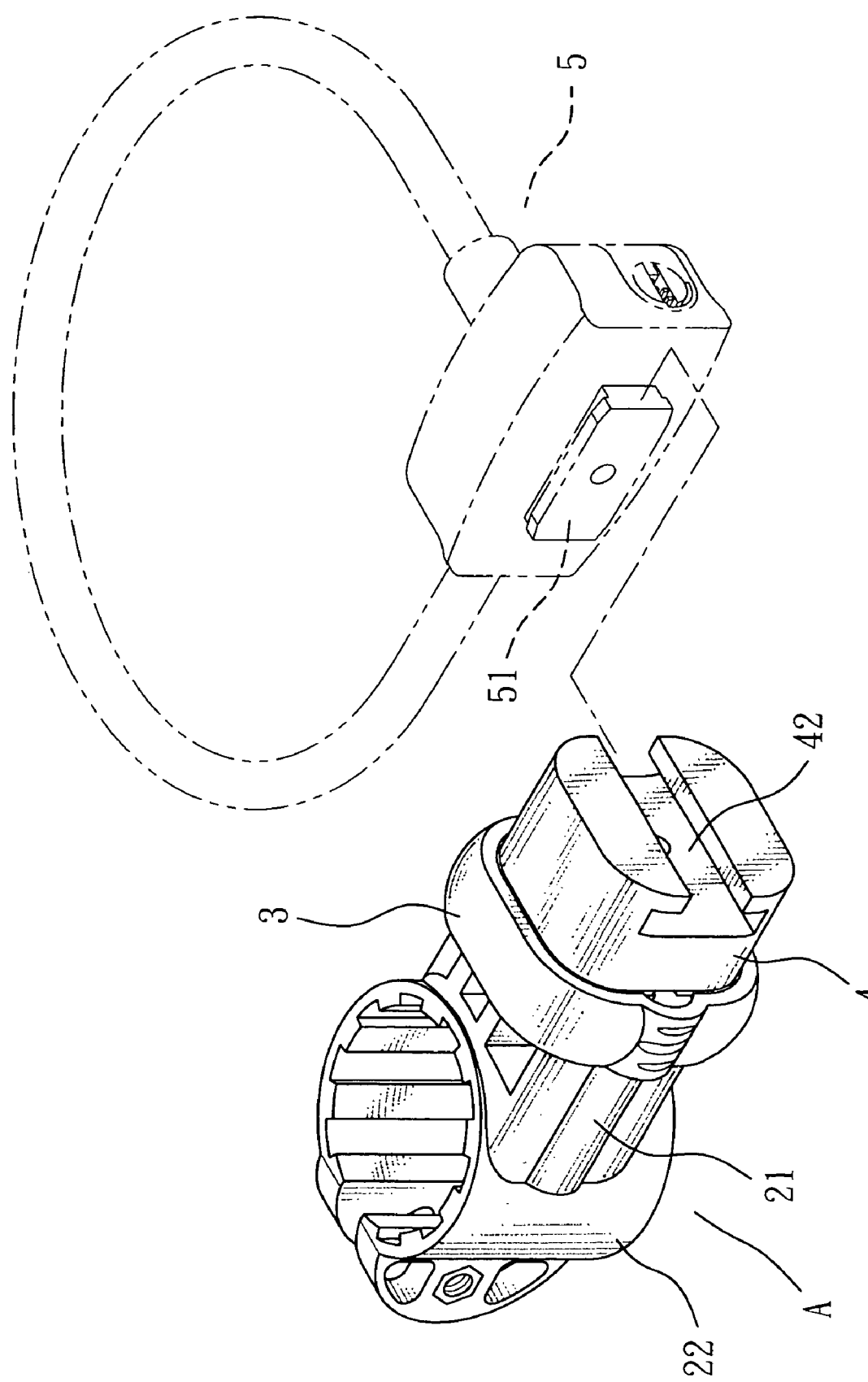
FIG. 4 is a perspective view of an embodiment of the invention.
Figure 8:
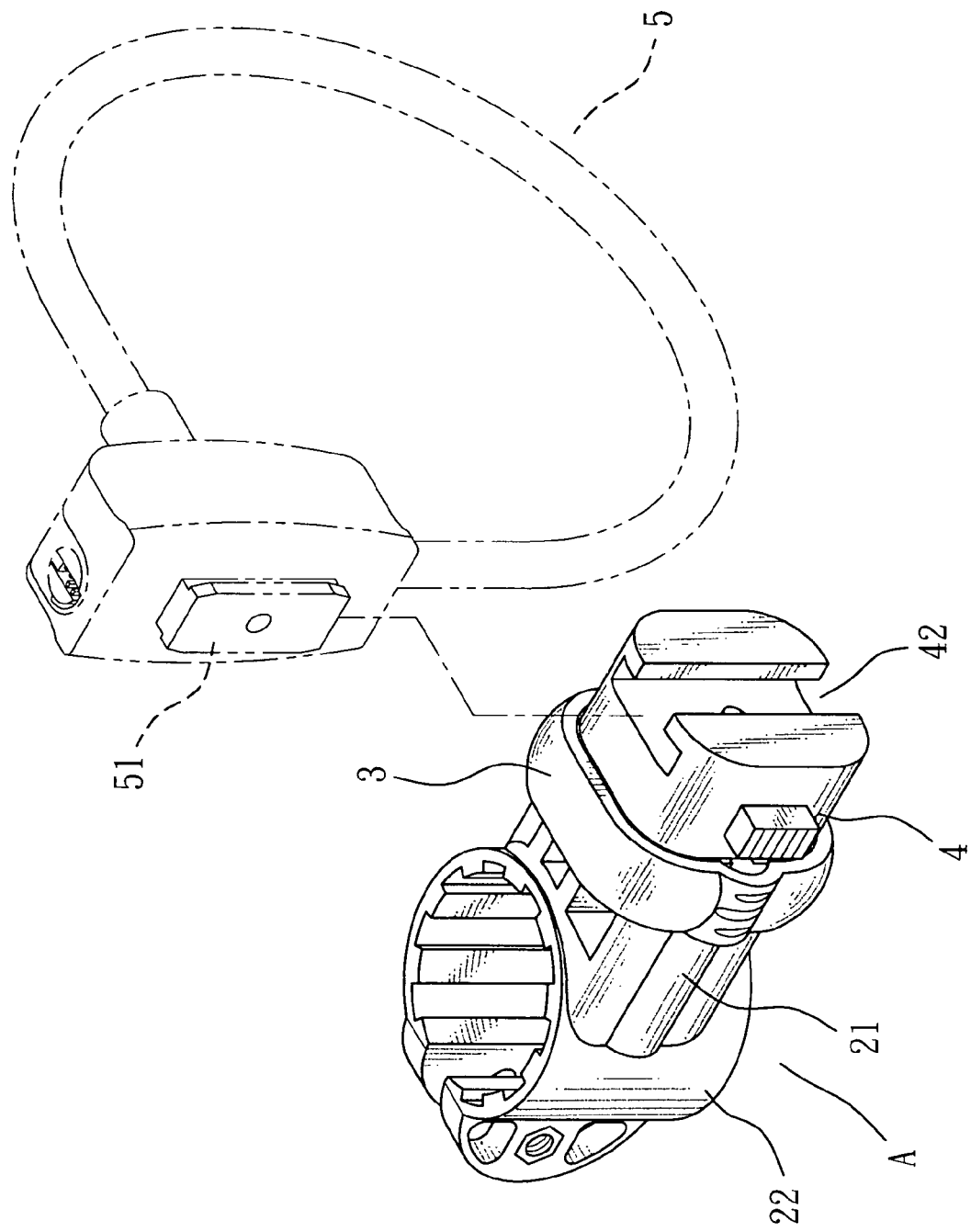
FIG. 8 is a perspective view of another embodiment of the invention.

Please referring to FIGS. 2 through 8, the present invention provides a bicycle accessory holding dock A which has an anchor seat 2 with a coupling portion 21 at one side. The coupling portion 21 is coupled with a retaining ring 3 to hold an accessory coupling seat 4.

The coupling portion 21 of the anchor seat 2 has two sides 211 each has a holding trough 2111 to hold an elastic element S3. The coupling portion 21 also has a distal end surface 212 with a first wedge trough 2121 and a second wedge trough 2122 formed thereon in a cross manner, and a bottom side 213 with a retaining trough 2131 formed thereon. The anchor seat 2 has a fastening portion 22 to fasten to a bicycle frame (not shown in the drawings). The fastening portion 22 is a standard feature known in the art, thus its details are omitted herein.

The retaining ring 3 is coupled with the coupling portion 21, and has a butting ridge 31 corresponding to the elastic element S3 held in the holding trough 2111 of the anchor seat 2, and an aperture 32 corresponding to the retaining trough 2131 to receive a bolt 33 to latch the retaining trough 2131 to confine the retaining ring 3.

The accessory coupling seat 4 is a standard element and has at least one first wedge flange 41 at one side to wedge in the first and second wedge troughs 2121 and 2122, and at least a third wedge trough 42 at another side to be wedged by a second wedge flange 51 of a bicycle accessory 5 (such as a steel cable lock).

By means of the construction set forth above, when in use to wedge the accessory coupling seat 4 in the anchor seat 2, push the retaining ring 3 so that the butting ridge 31 compresses the elastic element S3 held in the holding trough 2111 to expose the first and second wedge troughs 2121 and 2122; then the first wedge flange 41 of the accessory coupling seat 4 can be wedged in the first or second wedge trough 2121 or 2122 according to the required wedge direction; once the coupling seat 4 is positioned, release the retaining ring 3, the returning force of the elastic element S3 pushes the butting ridge 31 to allow the retaining ring 3 to retain the coupling portion 21 and prevent the coupling seat 4 from escaping. Thereafter the bicycle accessory 5 can be quickly hung by wedging the second wedge flange 51 in the third wedge trough 42 of the accessory coupling seat 4 (referring to FIGS. 4 through 8).

As a conclusion, the bicycle accessory holding dock of the present invention can hang a bicycle accessory in a direction as required. The structure is simpler and hanging operation is easier. The accessory can be held securely without loosening off. It provides a significant improvement over the conventional techniques While the preferred embodiments of the invention have been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. A bicycle accessory holding dock, comprising an anchor seat which has a coupling portion at one side to couple with a retaining ring for holding and retaining an accessory coupling seat, wherein:
   the coupling portion of the anchor seat has two sides each having a distinct holding trough holding an elastic element and a distal end surface which has a first wedge trough and a second wedge trough formed thereon, the anchor seat having a fastening portion to fasten to a bicycle frame; and
   the retaining ring is coupled with the coupling portion and has a butting ridge corresponding to the holding trough of the coupling portion to press the elastic element.

2. The bicycle accessory holding dock of claim 1, wherein the anchor seat has a bottom side which has a retaining trough formed thereon, the retaining ring having an aperture to receive a bolt to latch the retaining trough.

3. The bicycle accessory holding dock of claim 1, wherein the first wedge trough and the second wedge trough are formed in a cross manner on the distal end of the coupling portion.

4. The bicycle accessory holding dock of claim 1, wherein the accessory coupling seat has at least one first wedge flange at one side.

5. The bicycle accessory holding dock of claim 1, wherein the accessory coupling seat has at least one third wedge trough to be wedged by a second wedge flange of a bicycle accessory.

* * * * *